(12) United States Patent
Stewart

(10) Patent No.: US 8,776,408 B2
(45) Date of Patent: Jul. 15, 2014

(54) SHROUD ASSEMBLY

(75) Inventors: Danny Stewart, Kewdale (AU); Amy Francis Chapman, legal representative, Victoria Park (AU)

(73) Assignees: Wearforce Pty Ltd (AU); Castech Solutions Pty Ltd (AU); Daxit Pty Ltd (AU)

( * ) Notice: Subject to any disclaimer, the term of this patent is extended or adjusted under 35 U.S.C. 154(b) by 632 days.

(21) Appl. No.: 12/197,489

(22) Filed: Aug. 25, 2008

(65) Prior Publication Data

US 2009/0205227 A1    Aug. 20, 2009

(51) Int. Cl.
E02F 9/28    (2006.01)

(52) U.S. Cl.
USPC ............. 37/455; 37/457; 37/903; 172/772

(58) Field of Classification Search
USPC .......... 37/455, 450, 452, 456–458, 903, 906;
172/701.3, 772, 772.5; 299/106, 107, 299/113
See application file for complete search history.

(56) References Cited

U.S. PATENT DOCUMENTS

| | | | | |
|---|---|---|---|---|
| 2,635,366 A * | 4/1953 | Hostetter | | 37/459 |
| 4,748,754 A * | 6/1988 | Schwappach | | 37/451 |
| 5,088,214 A * | 2/1992 | Jones | | 37/450 |
| 5,435,084 A * | 7/1995 | Immel | | 37/398 |
| 5,438,774 A * | 8/1995 | Fletcher et al. | | 37/456 |
| 5,713,145 A * | 2/1998 | Ruvang | | 37/458 |
| 5,718,070 A * | 2/1998 | Ruvang | | 37/459 |
| 5,765,301 A * | 6/1998 | Clendenning | | 37/457 |
| 5,913,605 A * | 6/1999 | Jusselin et al. | | 37/451 |
| 5,983,534 A * | 11/1999 | Robinson et al. | | 37/459 |
| 6,079,132 A * | 6/2000 | Clendenning | | 37/457 |
| 6,108,950 A * | 8/2000 | Ruvang et al. | | 37/452 |
| 6,725,582 B2 * | 4/2004 | Adamic et al. | | 37/456 |
| 6,729,052 B2 * | 5/2004 | Ollinger et al. | | 37/452 |
| 6,826,855 B2 * | 12/2004 | Ruvang | | 37/450 |
| 6,848,203 B2 * | 2/2005 | Hohmann et al. | | 37/446 |
| 7,121,022 B2 * | 10/2006 | Bierwith | | 37/455 |
| 7,162,818 B2 * | 1/2007 | Ruvang et al. | | 37/456 |
| 7,165,347 B2 * | 1/2007 | Ollinger et al. | | 37/452 |
| 7,219,454 B2 * | 5/2007 | Maher | | 37/456 |
| 7,472,503 B2 * | 1/2009 | Maher | | 37/455 |
| 7,603,799 B2 * | 10/2009 | Campomanes | | 37/456 |
| 7,707,755 B2 * | 5/2010 | Lopez Almendros et al. | | 37/457 |
| 7,730,645 B2 * | 6/2010 | Ollinger, IV | | 37/328 |
| 7,730,652 B2 * | 6/2010 | McClanahan et al. | | 37/455 |
| RE41,855 E * | 10/2010 | Ruvang et al. | | 37/456 |
| 2006/0225313 A1* | 10/2006 | McClanahan et al. | | 37/450 |
| 2008/0005940 A1* | 1/2008 | Ollinger | | 37/452 |
| 2008/0209772 A1* | 9/2008 | Cui | | 37/456 |

* cited by examiner

Primary Examiner — Matthew Buck
(74) Attorney, Agent, or Firm — Harness, Dickey & Pierce, P.L.C.

(57) ABSTRACT

The present invention provides a protective shroud assembly for use on a wear edge of earthmoving machinery. The shroud assembly comprises a shroud adapted to be received with respect to the wear edge. The shroud has a wear region at a second end thereof which is adapted to engage the earth as the wear edge moves therethrough. The shroud assembly also comprises a locking means having a portion which is rotatably received in the shroud such that the shroud is releasably secured with respect to the wear edge when the locking means is in a locked position.

34 Claims, 9 Drawing Sheets

SHROUD ASSEMBLY

FIELD

The present invention relates particularly to the mining and construction industries and the use of earthmoving and similar machinery in those industries. More particularly this invention relates to a shroud assembly used to protect wear edges on items such as buckets on earthmoving equipment.

BACKGROUND

This section provides background information related to the present disclosure which is not necessarily prior art.

Within the mining and construction industries machinery, such as LHD's, excavators and front-end loaders, are used to move debris for various purposes. This machinery is often used in an extremely abrasive environment resulting in extreme wear on components.

The machinery often incorporates a bucket having a wear edge which digs into the earth during operation. Owing to the nature of the operating environment, the wear edge wears very quickly and requires protection to prevent costly repairs to or replacement of the bucket.

It is common practice to place a shroud, or a series of shrouds along the wear edge to act as a sacrificial wear component. These components are designed to be replaced when they have worn and are no longer providing the degree of protection required.

As the shrouds operate in a harsh environment it is essential that the construction of the shroud and the means in which they are attached to the bucket be as robust as possible. Currently there are a variety of means to secure a shroud to a bucket, including bolting or welding the shroud to the bucket, both of which are robust attachment means. However, when attached in this manner significant time is required to remove the worn shroud from the bucket.

Other securing means have also been developed. However, these are either complex in nature or are prone to damage during operation, rendering them difficult to remove or the damage may cause the shroud to detach from the bucket leaving the wear edge exposed.

The reference to the abovementioned prior art is for the purposes of background only and is not, and should not be taken as, an acknowledgment or any form of suggestion that the prior art forms part of the general knowledge.

SUMMARY

This section provides a general summary of the disclosure, and is not a comprehensive disclosure of its full scope or all of its features.

It is an object of this invention to provide a shroud assembly which can be locked relative to a wear edge and which can be easily removed when replacement is required.

The present invention provides a protective shroud assembly for use on a wear edge of earthmoving machinery, the shroud assembly comprising:
 a shroud adapted to be received with respect to the wear edge;
 the shroud having a wear region at a second end thereof, the wear region being adapted to engage the earth as the wear edge moves therethrough;
 a locking means having a portion which is rotatably received in the shroud such that the shroud is releasably secured with respect to the wear edge when the locking means is in a locked position.

Preferably the shroud has a slot at a first end extending along an axis of the shroud, the slot being adapted to snugly receive the wear edge.

The shroud may comprise a body and a leg portion, the leg portion extending rearwardly from the body such that it extends away from a closed end of the slot. The body may incorporate the slot.

Preferably adjacent to the wear edge of the earthmoving machinery an attachment means is secured, whereby in use the attachment means cooperates with the locking means to releasably secure the shroud with respect to the wear edge.

The attachment means may be in the form of a boss fixed adjacent to the wear edge over which the shroud is slidingly received.

The leg portion of the shroud may incorporate a channel parallel to its longitudinal extent for receiving the boss when the shroud is being positioned relative to the wear edge. The channel may be complementary in shape to the boss such that the boss is snugly received and retained in the channel when the shroud is in position such that the shroud is restricted to move relative to the boss along the length of the channel. The boss may have tapered sidewalls such that as the channel slides over the boss the shroud self centres and self aligns with respect to the boss. This enhances the fit of the shroud with respect to the wear edge.

When fitting the shroud to the wear edge, the channel of the leg portion is positioned relative to the boss so that the shroud can be slidingly received over the boss, and the wear edge is received in the slot. The channel may commence a distance from the end of the leg portion and extend towards the second end of the shroud, terminating a distance from the wear region.

The locking means may comprise a locking device and a compressible member, whereby in use the locking device is adapted to engage the compressible member to retain the shroud in position relative to the wear edge.

The compressible member may have a first face which is supported against the boss when in use. The compressible member may have a second face adapted to engage an external face of the locking device.

The compressible member may comprise a compressible material secured to a metal plate. The metal plate may provide the second face.

Preferably the shroud has an aperture therein for receiving the locking device. The aperture may be towards the rear of the leg portion. The aperture may open into the channel of the leg portion. The locking device may be threadingly received in the aperture so as to be rotatably received therein.

The locking device may be in the form of a cylinder. The cylinder may have a sidewall which incorporates at least one helix. The cylinder may have the at least one helix projecting from at least a portion of the sidewall. The at least one helix may be adapted to engage the compressible member.

The at least one helix may extend from the bottom of the cylinder sidewall towards the top of the sidewall. Preferably the at least one helix extends from the bottom of the cylinder sidewall to the top of the sidewall.

In one aspect of the invention the helix is in the form of a ramp extending outwardly from the centre of the cylinder as it travels around the cylinder so as to provide a cam like projection. The ramp may commence adjacent the bottom surface of the cylinder and extend progressively outward therefrom.

In another aspect of the invention the thickness of the helix extending from the side wall is substantially uniform.

A portion of an external surface of the helix may have at least one engaging section adapted to engage the second face of the compressible member such that when engaged the locking means is held in a locked position. In this position the engaging section retains the locking device in position relative to the compressible member. In the locked position the top of the cylinder is flush with or below a surface of the shroud.

In one aspect of the invention the engaging section is in the form of a flat surface which engages the second face of the compressible member.

In another aspect of the invention the engaging section and the second face of the compressible member are shaped to be complementary to each other such that when they align they cooperate to releasably lock together. This may be in the form of one or more projections on the engaging section of the locking device and a corresponding number of complementary recesses in the second face of the compressible member.

The shroud assembly may comprise means to indicate when the engaging section of the locking device is in the desired position.

Preferably the engaging section is positioned along the helix such that the compressible member is equal or close to maximum compression when the engaging section engages the compressible member. In this position the compressible member exerts a force upon the boss in a direction towards the wear edge whilst the cylinder exerts a force upon the shroud in a direction away from the wear edge. This ensures the shroud is retained in position relative to the wear edge.

The cylinder may have a plurality of engaging sections to allow the locking device to be adjusted as the shroud assembly experiences wear.

The locking device may be adapted to receive a tool to enable the locking device to be rotated.

The present invention provides a protective shroud assembly adapted to be fitted with respect to a wear edge, the shroud comprising:
  a first portion having a first end adapted to receive the wear edge and a second end providing a wear region;
  a second portion extending rearward from the second end of the first portion; and
  a locking means which cooperates with the second portion to releasably secure the shroud with respect to the wear edge.

The locking means may be in the form of a cylinder having a cam like surface extending outwardly from a sidewall of the cylinder. The locking means may also comprise a compressible member. The cam like surface may be adapted to engage the compressible member as the cylinder is rotatably received in an aperture incorporated in the second portion of the shroud.

In use the compressible member may be in abutment with a boss attached adjacent the wear edge, the shroud being slidingly received over the boss.

Preferably in use, the compressible member is forced against the boss as the cam like surface engages a face of the compressible member. As the cylinder is further received in the aperture, the compressible member is caused to compress, retaining the shroud in position with respect to the wear edge.

Preferably the cam like surface has a portion which engages the face of the compressible member when the cylinder is fully inserted within the aperture such that the cylinder is retained in position. Preferably the portion may be complementary in shape with the surface of the compressible member. The portion may be flat.

The present invention provides a protective shroud assembly for use on a wear edge of earthmoving machinery, the shroud assembly comprising:
  a shroud adapted to be received on a wear edge;
  the shroud having a wear region at a second end thereof, the wear region being adapted to engage the earth as the wear edge moves therethrough;
  a leg portion extending rearwardly from the first end of the shroud; and
  a locking means which cooperates with the leg portion to releasably secure the shroud with respect to the wear edge.

The present invention further provides a bucket of an earthmoving vehicle having a shroud as above described.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

The invention will be better understood by reference to the following description of two specific embodiments thereof as shown in the accompanying drawings in which.

Figure 4:
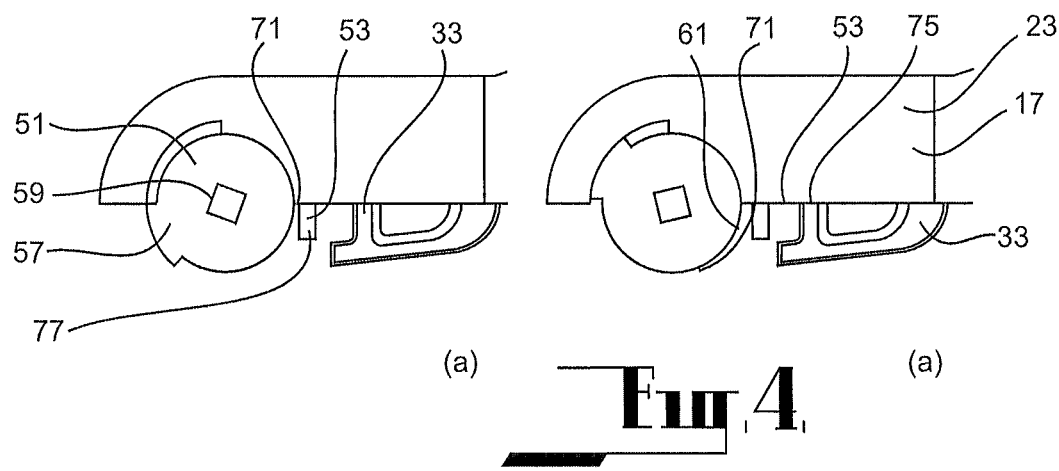
Figure 5:
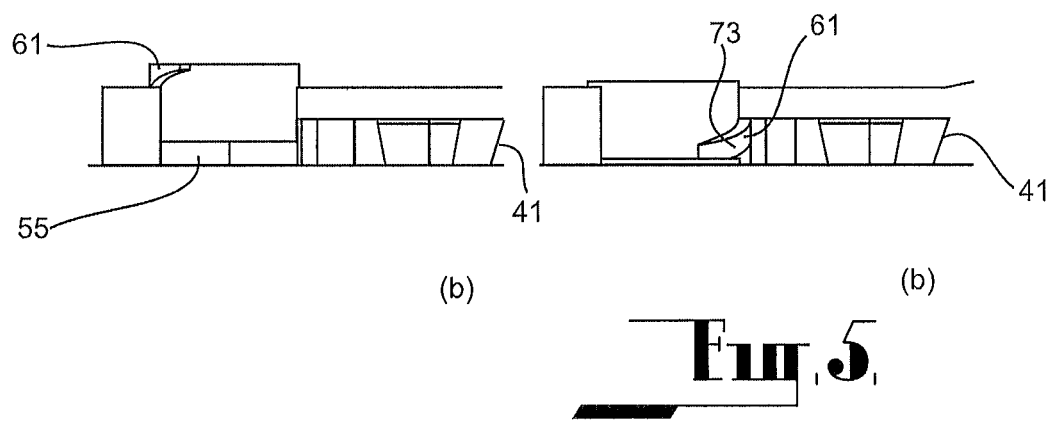
Figure 6:
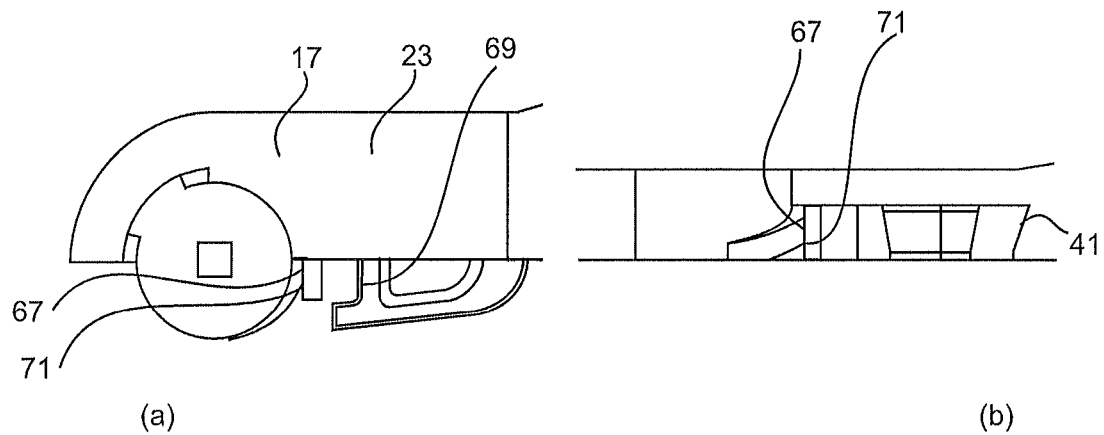
Figure 7:
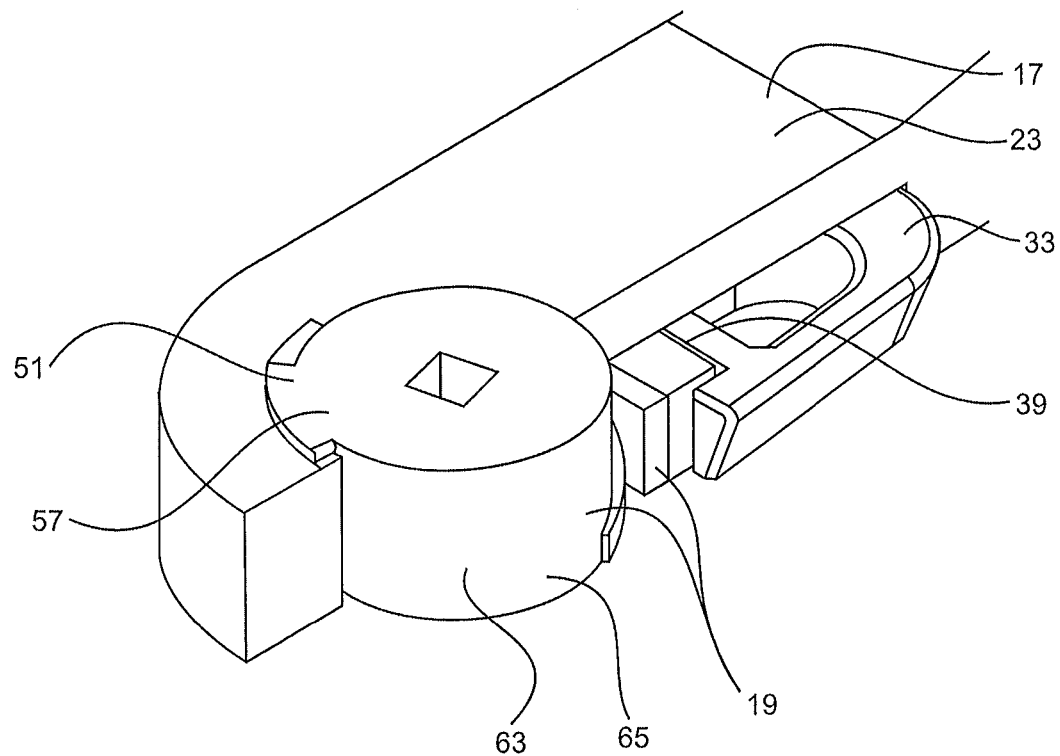
Figure 8:
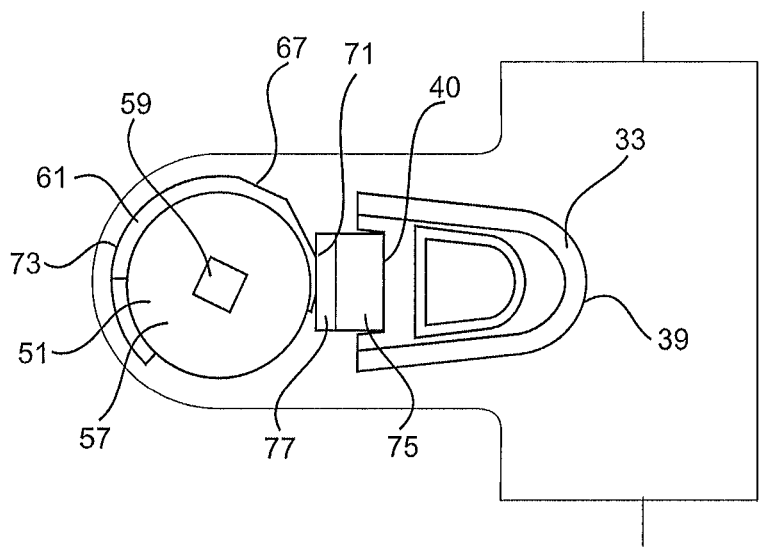
Figure 9:
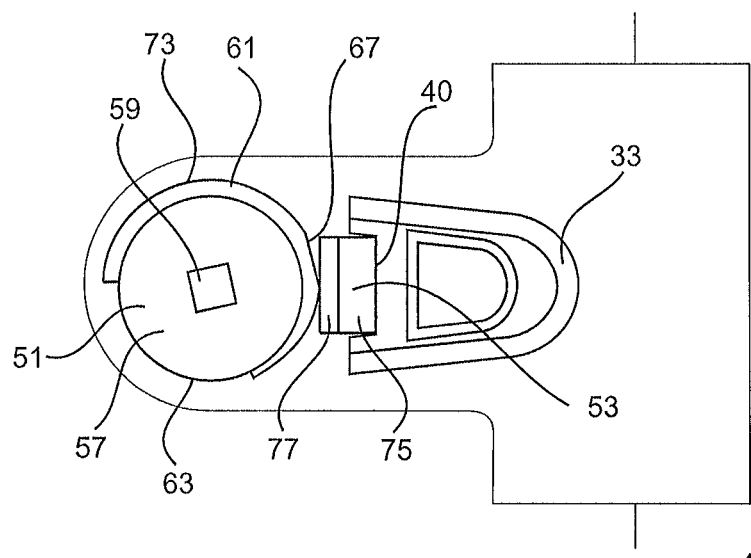
Figure 10:
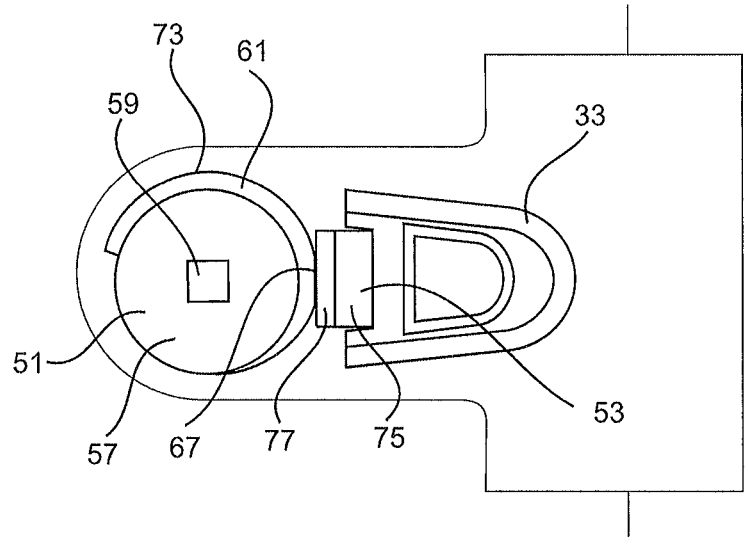
Figure 11:
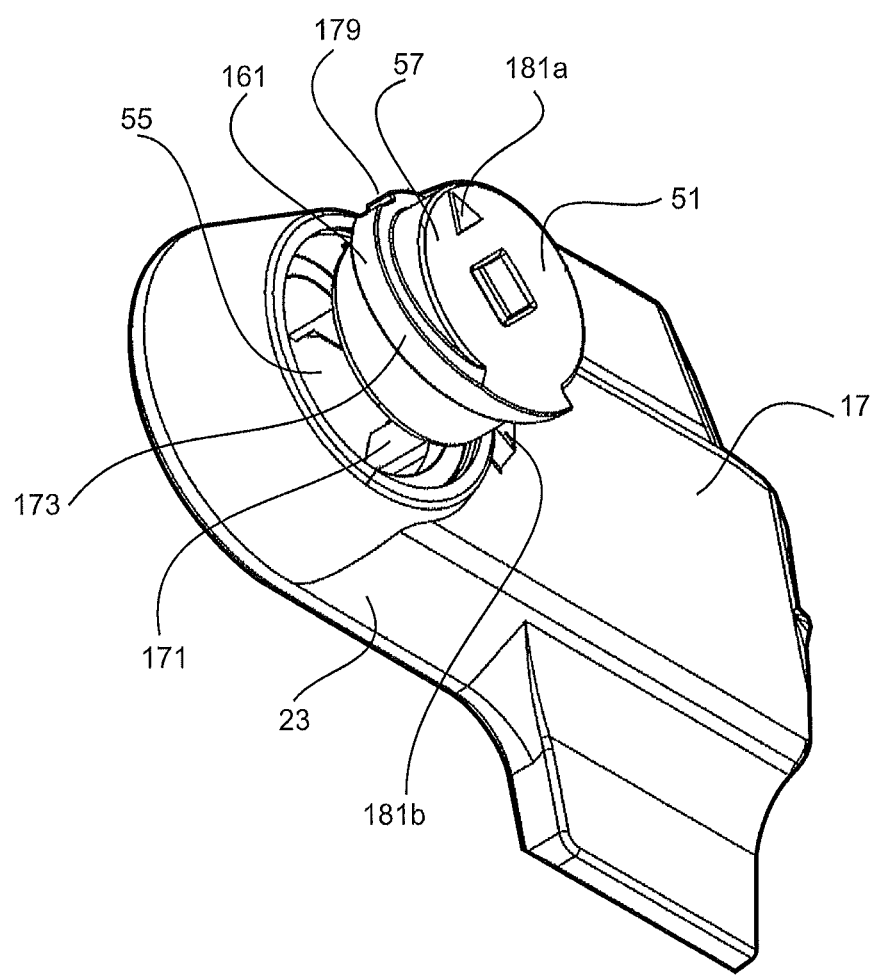
Figure 12:
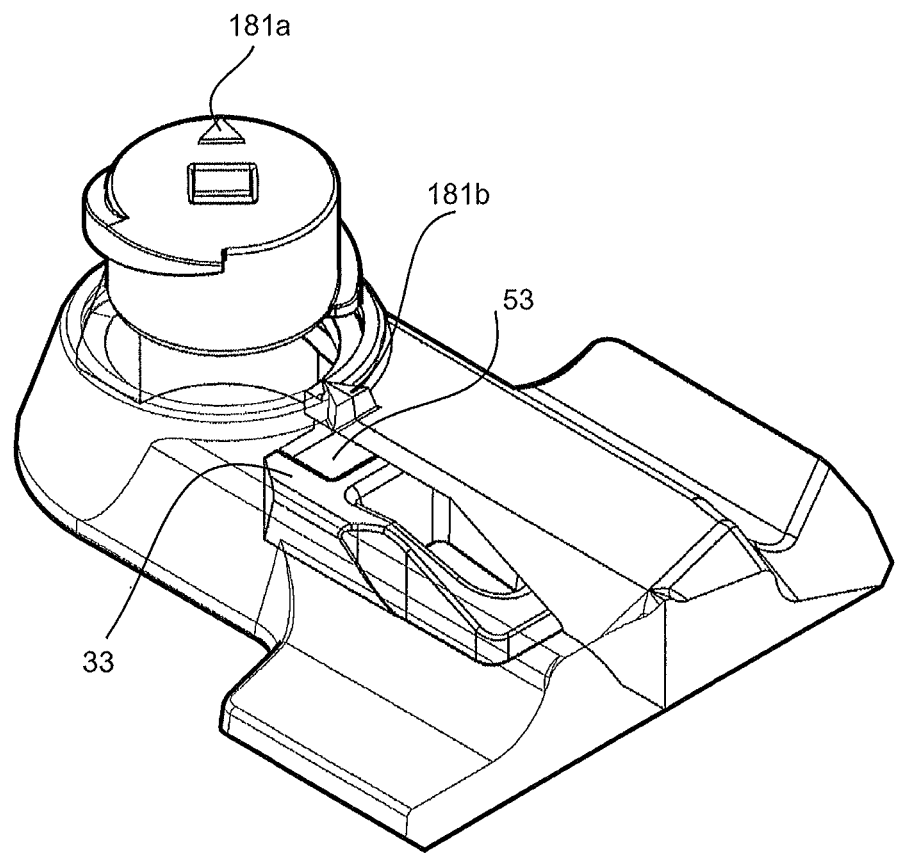
Figure 13:
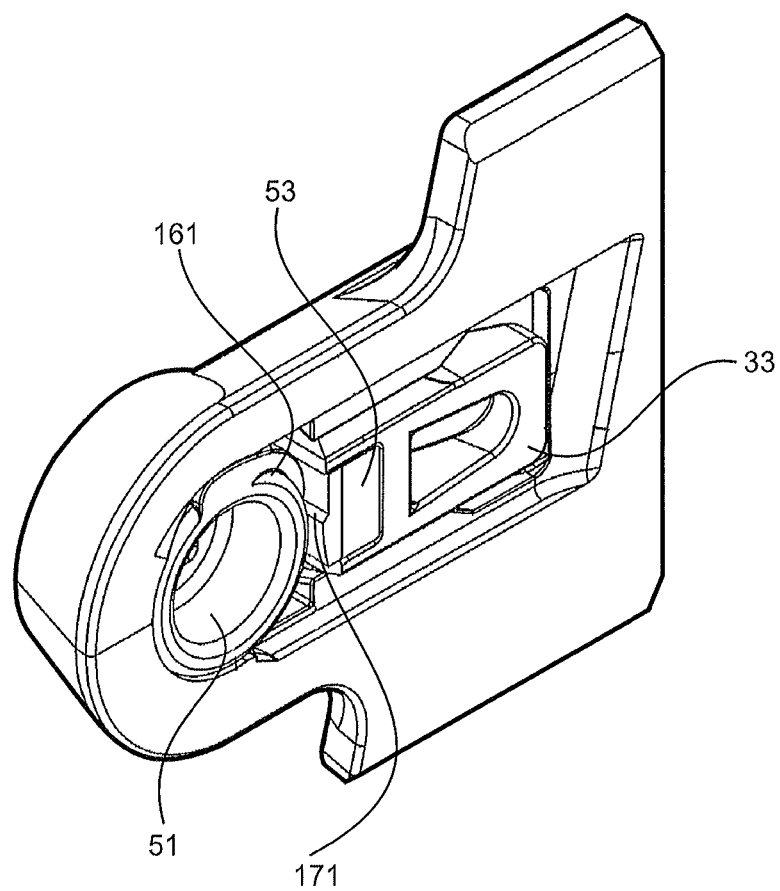
Figure 14:
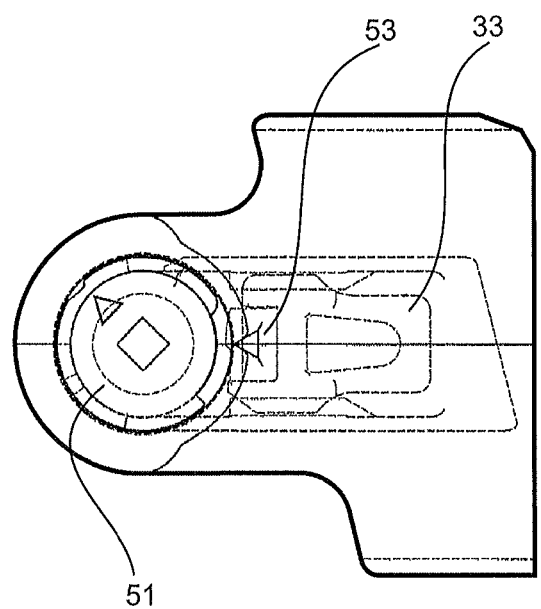

FIGS. 4a and b are a plan sectional and cross sectional view of the locking means engaging the shroud;

FIGS. 5a and b are a plan sectional and cross sectional view of the locking means engaging the shroud such that the locking means is approaching a locked position;

FIGS. 6a and b are a plan sectional and cross sectional view of the locking means engaging the shroud such that the locking means is in the locked position;

FIG. 7 is a perspective view of FIGS. 5a, b;

FIG. 8 is a schematic plan view of FIGS. 4a, b;

FIG. 9 is a schematic plan view of FIGS. 5a, b;

FIG. 10 is a schematic plan view of FIGS. 6a, b;

FIG. 11 is a sectional perspective view of a shroud according to a second embodiment of the invention with a locking device commencing engagement with the shroud;

FIG. 12 is a view similar to FIG. 11 but showing a section cut away;

FIG. 13 is a bottom view of the shroud engaged on a boss with the locking device received in the shroud; and FIG. 14 is a plan view similar to FIG. 12.

Corresponding reference numerals indicate corresponding parts throughout the several views of the drawings.

DETAILED DESCRIPTION

Example embodiments will now be described more fully with reference to the accompanying drawings.

The invention according to a first embodiment is shown in FIGS. 1 to 10, and takes the form of a shroud assembly 11. The invention has been designed to be releasably secured to a wear edge 13 on machinery. In this particular embodiment the shroud assembly is designed to be secured to a wear edge 13 on an excavator bucket 15.

The shroud assembly comprises a shroud 17 and a locking means 19, which cooperates with the shroud 17 to releasably secure the shroud 17 relative to the wear edge 13.

Figure 1:
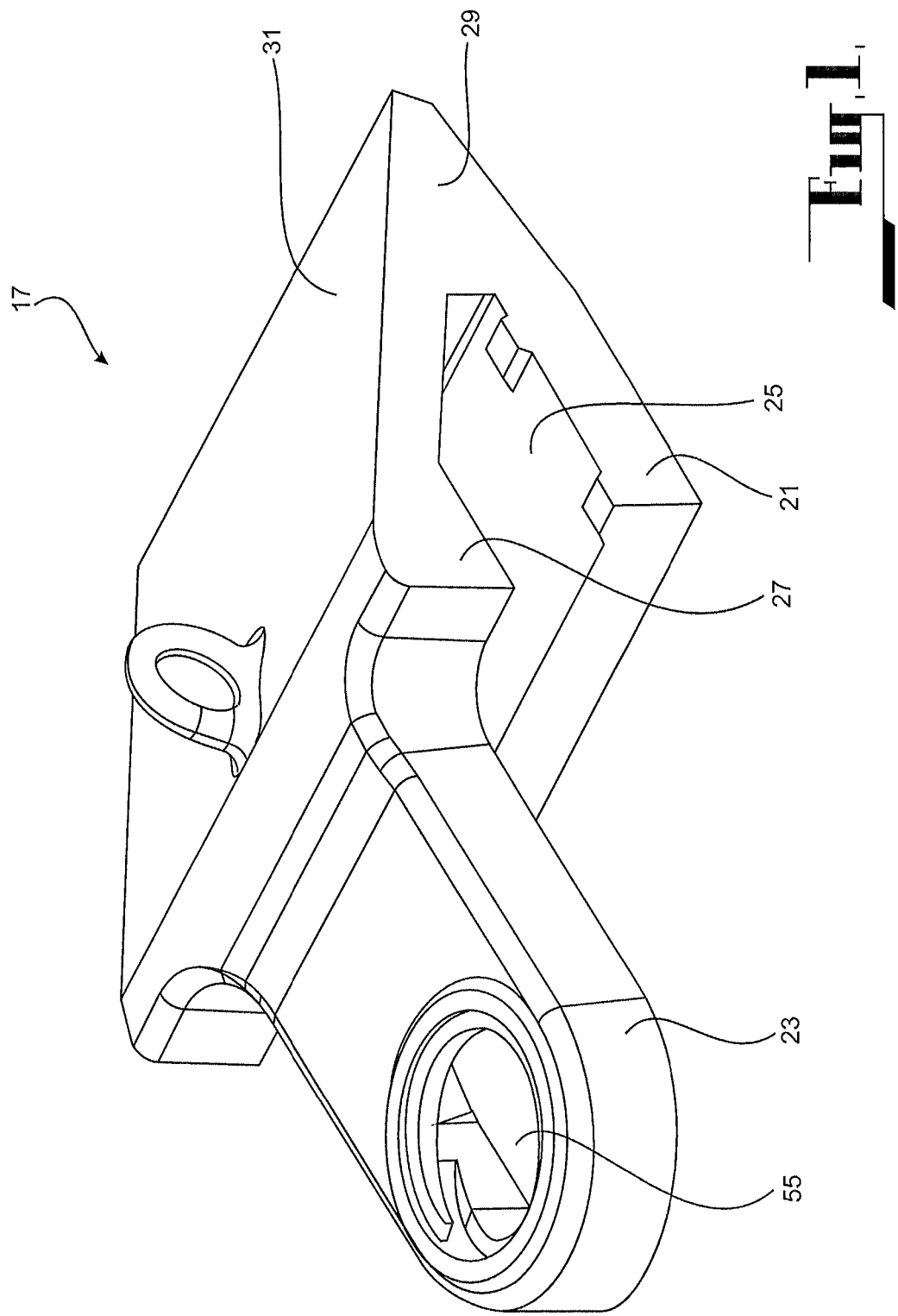
FIG. 1 is a perspective view of a shroud according to a first embodiment of the invention.

The shroud 17 comprises a body 21 and a leg portion 23 extending rearwardly from the body 21, as shown in FIG. 1.

The body 21 incorporates a slot 25 in a first end 27. The slot 25 is received over the wear edge 13 and is configured to complement the profile of the wear edge 13 so that there is good contact between the inner face of the slot 25, the wear edge 13 and the surfaces adjacent the wear edge 13.

A wear region 31 is provided at a second end 29 of the body 21. As the wear region 31 digs into the earth it is exposed to the greatest amount of wear.

The leg portion 23 of the shroud 17 incorporates a channel 35. The channel 35 commences a distance from the first end 37 of the leg portion 23 and extends towards the wear region 31 terminating a distance therefrom at a channel second end 41, as shown in FIGS. 4b, 5b and 6b.

Figure 2:
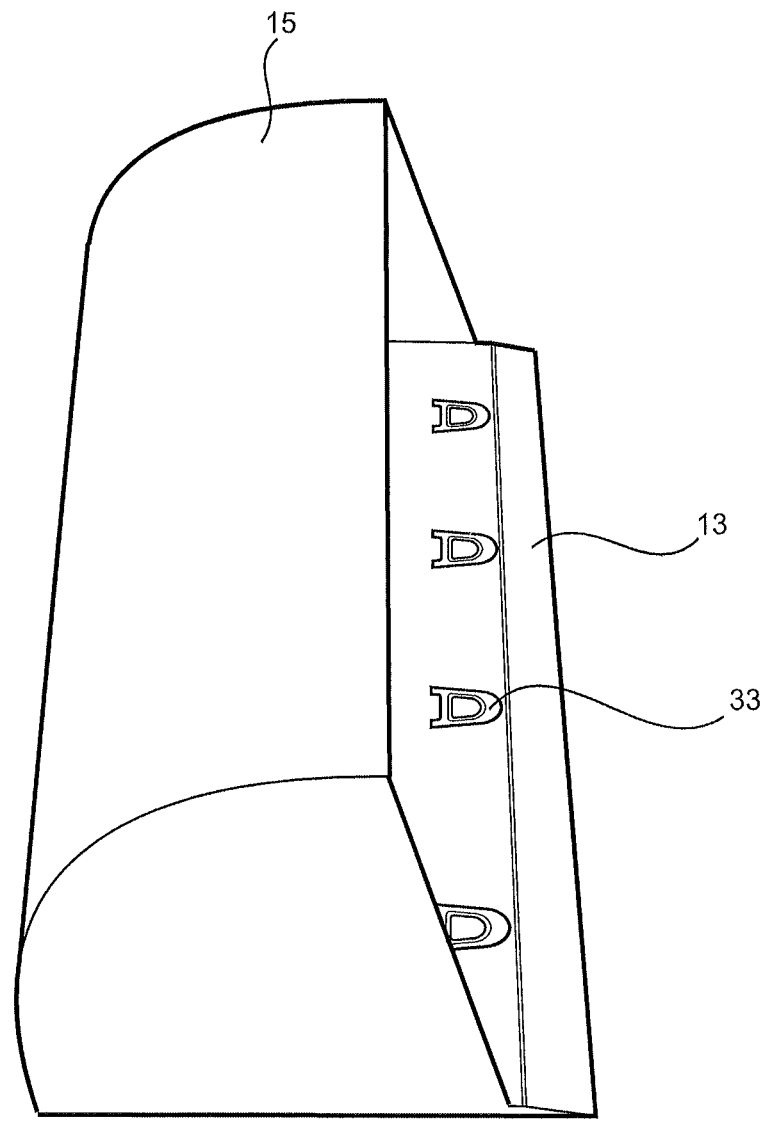
FIG. 2 is a plan sectional view of a bucket having a boss secured thereto.

In order to secure the shroud 17 relative to the wear edge 13, the bucket 15 has attachment means in the form of a boss 33, as shown in FIG. 2. In this embodiment the boss 33 is welded to the bucket 15 adjacent the wear edge 13.

The boss 33 and channel 35 are complementary in shape such that the channel 35 slidingly receives the boss 33 therein. In this embodiment the length of the channel 35 is such that when the shroud 17 is locked in position, as will be explained below, the rear end 39 of the boss 33 abuts the channel second end 41.

The locking means 19 comprises a locking device 51. The locking device 51 is adapted to be rotatably received in an aperture 55 which extends through the leg portion 23. The locking device 51 is in the form of a cylinder 57 having an indent 59 in the top surface adapted to receive a tool (not shown) to rotate the cylinder 57 relative to the shroud 17.

The cylinder 57 has a helix 61 extending from its sidewall 63. The helix 61 is in the form of a ramp which increasingly extends outwardly from the sidewall 63 commencing from the bottom of the sidewall 65.

An external face 73 of the helix 61 incorporates an engaging section in the form of a flat section 67, for reasons which will be explained below. In this embodiment the flat section 67 is incorporated in the helix 61 adjacent to the thickest outward section of helix 61.

The locking means 19 also comprises a compressible member 53. The compressible member 53 comprises a compressible material 75 secured to a metal plate 77. The compressible material 75 provides a first face 69 which is supported against the boss 33 when the shroud assembly is in position. The metal plate 77 provides a second face 71 adapted to engage the external face 73 of the helix 61.

The aperture 55 extends into the leg portion 23 such that the aperture 55 opens into the channel 35.

To secure the shroud 17 relative to the wear edge 13 the compressible member 53 is positioned relative to the boss 33 such that its first face 69 engages a front end 40 of the boss 33.

Figure 3:
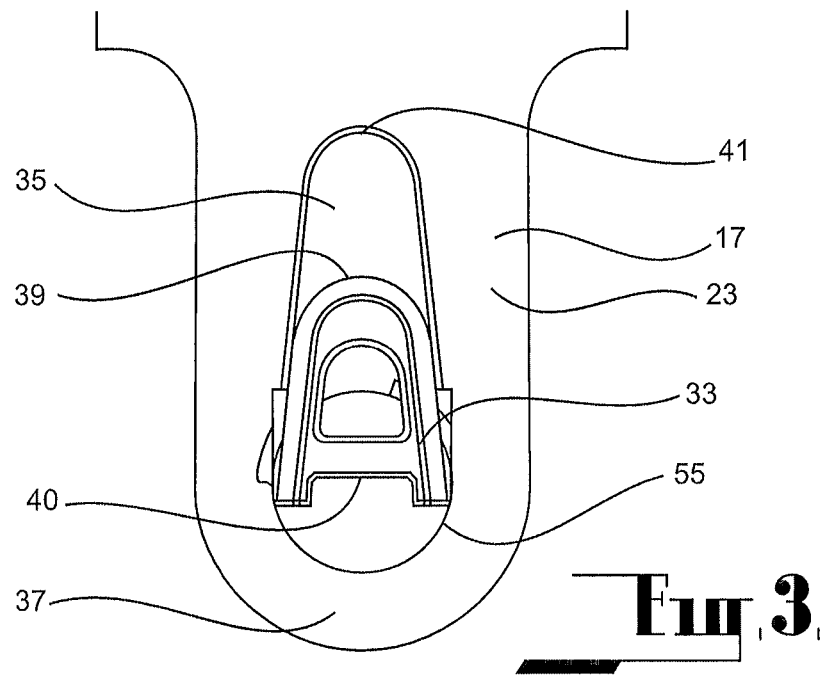
FIG. 3 is a plan partial view of the shroud slidingly engaging the boss.

The aperture 55 of the shroud 17 is then positioned above the boss 33. The boss 33 can then be received in the lower part of the aperture 55 such that the boss 33 aligns with the channel 35, as shown in FIG. 3.

From this position the shroud 17 slides along the bucket 15 surface so that the wear edge 13 enters the slot 25 and the boss 33 is received in the channel 55. The shroud 17 continues to slide along the bucket until the boss 33 engages the channel second end 41 and/or the wear edge 13 abuts the closed end of the slot 25.

Once the shroud 17 is in position the locking device 51 is threadingly received in the aperture 55. As the locking device 51 is received in the aperture 55 the external face 73 of the helix 61 engages the second face 71 of the compressible member 53. See FIGS. 4a, b and 8.

Further rotation of the locking device 51 causes external face 73 to increasingly extend towards the boss 33. This causes the compressible material 75 to compress. See FIGS. 5a, b, 7 and 9.

Eventually the flat section 67 on the external face 73 of the helix 61 aligns with and engages the second face 71 of the compressible member 53. In this position the locking device 51 is retained in a locked position wherein the upper surface of the cylinder 57 is flush with the upper surface of the shroud 17 and the compressible member 53 is fully compressed (or approaching this condition). See FIGS. 6a, b, and 10.

When in the locked position the compressible member 53 exerts a force upon the boss 33 in a direction towards the wear edge 13 whilst the locking device 51 exerts a force upon the shroud 17 in a direction away from the wear edge 13. This ensures the shroud 17 is retained in position relative to the wear edge 13.

In order to remove the shroud 17, the locking device 51 must be moved to an unlocked condition. In order to do this the locking device 51 is rotated so that the flat section 67 on the external face 73 of the helix 61 disengages the second face 71 of the compressible member 75. After further rotation the locking device 51 can be removed from the aperture 55 allowing the shroud 17 to be removed from the bucket 15.

To move the locking device 51 into the locked or unlocked condition a tool may be inserted into the indent 59 such that the locking device 51 may be more readily rotated.

FIGS. 11 to 14 relate to a shroud assembly according to a second embodiment of the invention. This embodiment is very similar to the first embodiment. As a result like numbers are used to illustrate like components of the two embodiments.

In the second embodiment the cylinder 57 of the locking device 51 has a helix 161 which extends from the sidewall 63 between the bottom and top of the cylinder. The helix 161 projects outwardly from the sidewall 63 in a manner whereby the degree of projection is uniform along the helix 161.

As best illustrated in FIGS. 12 and 14, the helix 161 has an engaging section, in the form of a recess 179, incorporated within the external face 173 of the helix 161. Similarly a second face 171 is shaped to complement the shape of the recess 179 such that when the recess 179 aligns with the second face 171 the locking device 51 is releasably locked with respect to the compressible member 53.

This embodiment also provides a visual indicator 181a, 181b, which when aligned, indicates when locking device 51 is in a locked position, whereby the engaging section of the helix 161 aligns with the second face 171 of the compressible member.

Modifications and variations such as would be apparent to the skilled addressee are considered to fall within the scope of the present invention.

Throughout the specification, unless the context requires otherwise, the word "comprise" or variations such as "comprises" or "comprising", will be understood to imply the inclusion of a stated integer or group of integers but not the exclusion of any other integer or group of integers.

The foregoing description of the embodiments has been provided for purposes of illustration and description. It is not intended to be exhaustive or to limit the invention. Individual elements or features of a particular embodiment are generally not limited to that particular embodiment, but, where application, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A protective shroud assembly for use on a wear edge of earthmoving machinery, the shroud assembly comprising:
   a shroud adapted to be received with respect to the wear edge, the shroud including a leg portion having a channel extending parallel to its longitudinal extent;
   the shroud having a wear region at a second end thereof, the wear region being adapted to engage the earth as the wear edge moves therethrough, the channel extending for a distance from an end of the leg portion towards the second end of the shroud, terminating a distance from the wear region, such that opposed ends of the channel are closed;
   a locking means having a portion which is rotatably received in the channel of the shroud between the closed ends of the channel such that the shroud is releasably secured with respect to the wear edge when the locking means is in a locked position;
   wherein when in the locked position the locking means is retained in the locked position;
   wherein, when the locking means is in the locked position, the locking means exerts a force upon the shroud in a direction away from the wear edge.

2. The protective shroud assembly according to claim 1 wherein the shroud has a slot at a first end extending along an axis of the shroud, the slot being adapted to snugly receive the wear edge.

3. The protective shroud assembly according to claim 2 wherein the shroud comprises a body and a leg portion, the leg portion extending rearwardly from the body such that it extends away from a closed end of the slot, and the body incorporates the slot.

4. The protective shroud assembly according to claim 3 wherein an attachment means is secured adjacent the wear edge of the earthmoving machinery, whereby in use the attachment means cooperates with the locking means to releasably secure the shroud with respect to the wear edge, the attachment means is in the form of a boss over which the shroud is slidingly received.

5. The protective shroud assembly according to claim 4 wherein the channel receives the boss when the shroud is being positioned relative to the wear edge.

6. The protective shroud assembly according to claim 5 wherein the channel is complementary in shape to the boss such that the boss is snugly received and retained in the channel when the shroud is in position such that the shroud is restricted to move relative to the boss along the length of the channel.

7. The protective shroud assembly according to claim 6 wherein the boss has tapered sidewalls such that as the channel slides over the boss the shroud self centres and self aligns with respect to the boss.

8. The protective shroud assembly according to claim 1 wherein the locking means comprises a locking device and a compressible member, whereby in use the locking device is adapted to engage the compressible member to retain the shroud in position relative to the wear edge.

9. The protective shroud assembly according to claim 8 wherein the compressible member has a first face which is supported against a boss when in use, and a second face adapted to engage an external face of the locking device.

10. The protective shroud assembly according to claim 9 wherein the compressible member comprises a compressible material secured to a metal plate whereby the metal plate provides the second face.

11. The protective shroud assembly according to claim 8 wherein the shroud has an aperture therein for receiving the locking device.

12. The protective shroud assembly according to claim 11 wherein the aperture is towards a rear of the leg portion.

13. The protective shroud assembly according to claim 11 wherein the aperture extends through the leg portion substantially perpendicular thereto, the aperture opening into the channel of the leg portion.

14. The protective shroud assembly according to claim 11 wherein the locking device is threadingly received in the aperture so as to be rotatably received therein.

15. The protective shroud assembly according to claim 8 wherein the locking device is in the form of a cylinder.

16. The protective shroud assembly according to claim 15 wherein the cylinder has a sidewall which incorporates at least one helix, the at least one helix projecting from at least a portion of the sidewall.

17. The protective shroud assembly according to claim 16 wherein the at least one helix is adapted to engage the compressible member.

18. The protective shroud assembly according to claim 16 wherein the at least one helix extends from the bottom of the cylinder sidewall towards the top of the sidewall.

19. The protective shroud assembly according to claim 16 wherein the at least one helix extends between the bottom of the cylinder sidewall and the top of the sidewall.

20. protective shroud assembly according to claim 16 wherein the helix is in the form of a ramp extending outwardly from the centre of the cylinder as it travels around the cylinder so as to provide a cam like projection.

21. The protective shroud assembly according to claim 20 wherein the ramp extends progressively outwardly as the ramp moves from adjacent the bottom surface of the cylinder towards the top of the sidewall.

22. The protective shroud assembly according to claim 16 wherein the thickness of the helix extending from the side wall is substantially uniform.

23. The protective shroud assembly according to claim 8 wherein the locking device is adapted to receive a tool to enable the locking device to be rotated.

24. A bucket or similar wear component of an earthmoving vehicle having a protective shroud assembly according to claim 1.

25. A protective shroud assembly for use on a wear edge of earthmoving machinery, the shroud assembly comprising:
   a shroud adapted to be received with respect to the wear edge;
   the shroud having a wear region at a second end thereof, the wear region being adapted to engage the earth as the wear edge moves therethrough;
   a locking means having a portion which is rotatably received in the shroud such that the shroud is releasably secured with respect to the wear edge when the locking means is in a locked position, the locking means including a locking device and a compressible member, whereby in use the locking device is adapted to engage the compressible member to retain the shroud in position relative to the wear edge, the locking device being in the form of a cylinder, the cylinder having a sidewall which incorporates at least one helix, the at least one helix projecting from at least a portion of the sidewall;

wherein when in the locked position the locking means is retained in the locked position;

wherein, when the locking means is in the locked position, the locking means exerts a force upon the shroud in a direction away from the wear edge;

wherein the compressible member has each of a first face and a second face, and wherein a portion of an external surface of the helix has at least one engaging section adapted to directly engage the second face of the compressible member such that when engaged the locking means is held in the locked position to retain the locking device in position relative to the compressible member.

26. The protective shroud assembly according to claim 25 whereby in the locked position the top of the cylinder is flush with or below an upper surface of the leg portion of the shroud.

27. The protective shroud assembly according to claim 25 wherein the engaging section is in the form of a flat surface which engages the second face of the compressible member.

28. The protective shroud assembly according to claim 25 wherein the engaging section and the second face of the compressible member are shaped to be complementary to each other such that when they align they cooperate to releasably lock together.

29. The protective shroud assembly according to claim 28 wherein the engaging section has one or more projections on the engaging section of the locking device and a corresponding number of complementary recesses in the second face of the compressible member.

30. The protective shroud assembly according to claim 25 further comprising means to indicate when the engaging section of the locking device is in position.

31. The protective shroud assembly according to claim 25 wherein the engaging section is positioned along the helix such that the compressible member is equal or close to maximum compression when the engaging section engages the compressible member.

32. The protective shroud assembly according to claim 25 when dependent on claim 21 wherein the locking device has a plurality of engaging sections to allow the locking device to be adjusted as the shroud assembly experiences wear.

33. A protective shroud assembly for use on a wear edge of earthmoving machinery, the shroud assembly comprising:

a shroud adapted to be received on the wear edge;

the shroud having a wear region at a second end thereof, the wear region being adapted to engage the earth as the wear edge moves therethrough;

a leg portion extending rearwardly from a first end of the shroud;

an underside of the leg portion having a closed ended channel incorporated therein;

an aperture through which a locking means is receivable, the aperture passing through the leg portion substantially perpendicular thereto, the aperture extending into the channel;

wherein the locking means cooperates with the leg portion to releasably secure the shroud with respect to the wear edge; and the locking means being arranged to exert a force upon the shroud in a direction away from the wear edge when the locking means is in a locked position.

34. A protective shroud assembly for use on a wear edge of earthmoving machinery, the shroud assembly comprising:

a shroud adapted to be received with respect to the wear edge, the shroud having a leg portion extending rearwardly from a first end of the shroud and a closed ended channel incorporated therein;

a wear region at a second end of the shroud, the wear region being adapted to engage the earth as the wear edge moves therethrough;

an aperture that is substantially perpendicular to the longitudinal extent of the shroud and extending into the channel, through which a cylindrical locking device is receivable; and the cylindrical locking device being rotatably received in the aperture such that the shroud is releasably secured with respect to the wear edge when the cylindrical locking device is in a locked position, the cylindrical locking device being held in position when in the locked position.

* * * * *

UNITED STATES PATENT AND TRADEMARK OFFICE
CERTIFICATE OF CORRECTION

PATENT NO. : 8,776,408 B2  Page 1 of 1
APPLICATION NO. : 12/197489
DATED : July 15, 2014
INVENTOR(S) : Vaughan It is certified that error appears in the above-identified patent and that said Letters Patent is hereby corrected as shown below:

Title page, item (12), delete "Stewart" and insert --Vaughan--.

Title Page, Item (75) Inventor is corrected to read:

--Allen Vaughan, Kewdale, Western Australia (AU)--.

Signed and Sealed this
Sixth Day of January, 2015

Michelle K. Lee
*Deputy Director of the United States Patent and Trademark Office*